Patented July 6, 1948

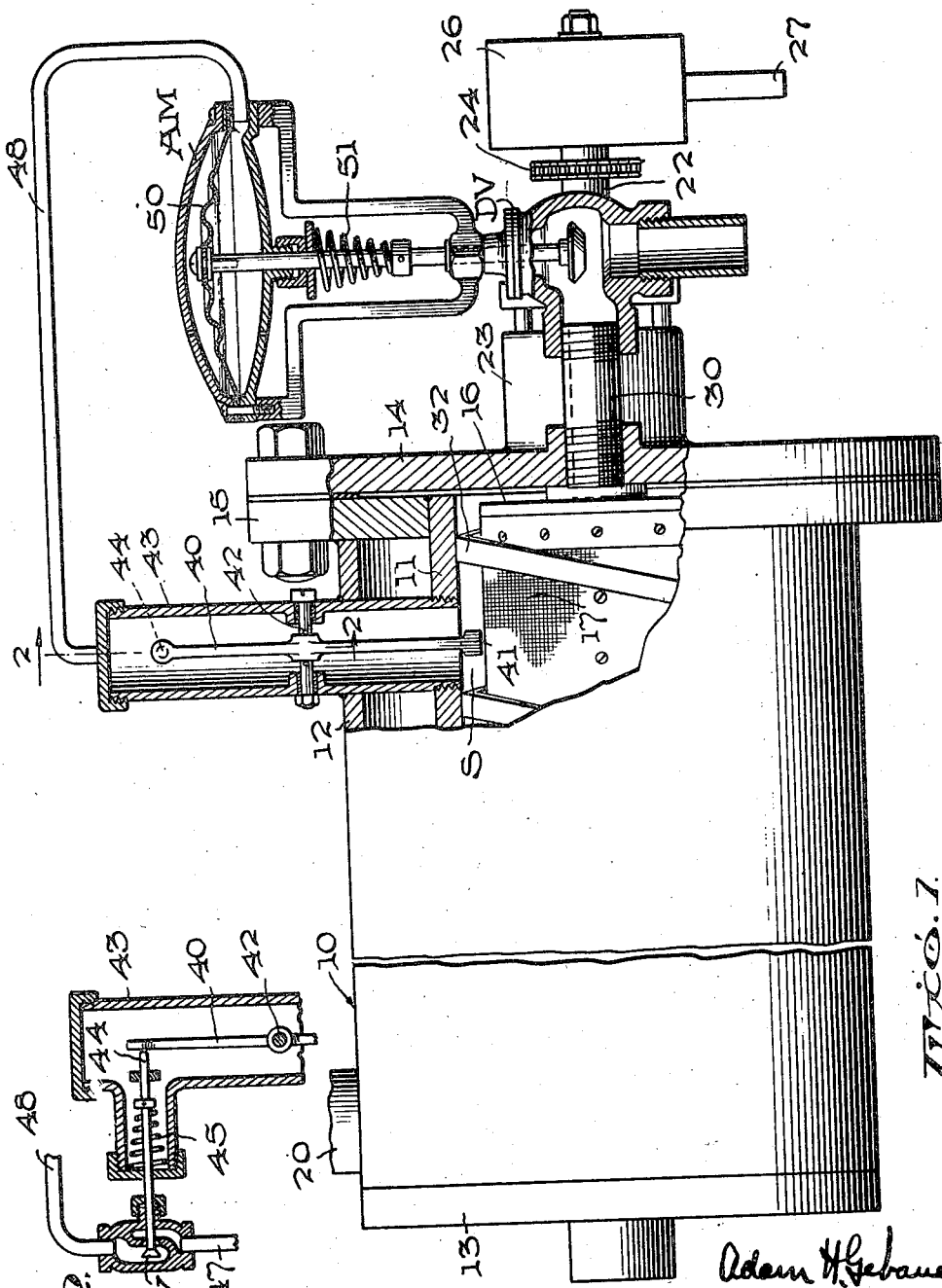

2,444,563

UNITED STATES PATENT OFFICE 2,444,563

REGULATING APPARATUS

Adam H. Gebauer, Short Hills, N. J., assignor to Tide Water Associated Oil Company, Bayonne, N. J., a corporation of Delaware Application December 18, 1943, Serial No. 514,765

5 Claims. (Cl. 210—201)

This invention relates to improvements in regulating apparatus, and more particularly to apparatus for regulating the processing of semi-solid or plastic materials in accordance with changes in certain physical conditions thereof, for example consistency, plasticity, density, and the like.

While not limited thereto, the invention is especially adapted for use in the recovery of wax from slack-wax obtained in refinery procedure by pressure filtering in a filter of the type disclosed in my copending applications Serial Numbers 514,619, now Patent Number 2,408,977, and 514,764, now Patent Number 2,439,463, filed December 17, 1943, and December 18, 1943, respectively. In such a filter a hot slack-wax slurry is fed into an elongated annular space surrounding a cylindrical filter element at a pressure causing the wax particles to agglomerate. The agglomerated particles filtering out in the region of the charging end are thereupon conveyed the length of the space, being simultaneously kneaded or worked during such movement, to a wax discharge opening, the oil content being meanwhile expressed through the filter element as a liquid filtrate. The discharge opening provides a restriction to the free flow of the separated wax through the filter with the result that the wax particles are progressively compacted in the region of the space adjacent the discharge opening prior to extrusion therethrough to a consistency such that they form a solid wax seal which functions to prevent channeling or blow-by of unworked or partially deoiled wax through the filter. With the depth of the wax seal determining the degree of deoiling and also the capacity of the filter, and with factors such as change in pressure and temperature of the slurry tending to increase or decrease the depth of the seal, it will be appreciated that close supervision is required for optimum results, particularly in a filter operating with a shallow seal which has been found to be desirable.

The present invention contemplates and provides an effective and simple means for automatically maintaining such a material seal of the proper depth for effective deoiling and which at the same time is sufficiently shallow to provide a high filtering rate. More specifically, the invention has for its object the provision of means for automatically regulating the depth of the compacted wax forming the seal as aforesaid, being operable to detect any change in consistency, and, in particular, a lowering of consistency, and thereupon to re-establish the predetermined proper depth of seal, as by retarding or further restricting the flow of the compacted and deoiled wax through the filter discharge opening.

Other objects will be in part obvious and in part hereinafter pointed out in the following description of the invention wherein is illustrated an embodiment in detail.

In the drawing,

Fig. 1 is a side elevation partly in section of a filter adapted for the pressure filtering of semi-solid or plastic materials, such as slack wax, equipped with a regulator according to the invention; and Fig. 2 is a section taken along line 2—2 of Fig. 1.

In the drawing, wherein like characters refer to like parts throughout the several views, reference character 10 designates generally a pressure filter of the type disclosed in my copending applications above referred to, such being constituted by an outer cylindrical shell or body 11 enclosed within a jacketing shell 12, both shells being closed at their ends by suitable end plates 13, 14, the latter being bolted to a radial plate flange 15 welded or otherwise secured to the discharge end of the shell 11 and to the related end of the shell 12. Mounted for rotation within the shell 11 is a cylindrical filter element generally designated 16, comprising a shell which is suitably perforated or otherwise formed to permit passage of the liquid filtrate therethrough and whose outer surface is shown to be wrapped with a filtering cloth or screen 17. The diameter of the filter element 16 is substantially less than the inner diameter of the outer shell 11, thus to provide an annular space extending the length of the filter, to which the material under treatment, for example a slurry of hot slack wax, is fed through an inlet connection 20 under suitable pressure. The filter element is supported for rotation at its discharge end by a hollow shaft 22 extending through a stuffing box 23, the shaft being driven through a sprocket 24 from a suitable source of power. Hence, rotation of the shaft results in the rotation of the filter element 16 within the shell 11. The liquid filtrate passing to the interior of the filter element 16 is taken off through the hollow shaft 22 and delivered to a collecting head 26 provided with an outlet 27, the solids, i. e., agglomerated wax particles, which separate out in the annular space S being removed through a discharge pipe 30 opening to said space through the end plate 14 at a point displaced from its center. A discharge valve generally designated DV is connected in the discharge pipe 30 for controlling discharge of the separated solids through the pipe.

In such a filter, the wax particles filtering out in the annular space or adhering to the outer surface of the filter element 16 are conveyed along the length of the space to the outlet pipe 30 in such a manner that they are simultaneously worked and kneaded during such movement, through the provision of a helical blade 32 carried by the shell 11 and extending from the inner periphery thereof into the aforesaid annular space. As the filter element is rotated, the blade functions to collect the separated particles and to convey them along the space to the discharge end of the filter.

While of ample size for the selected rate of discharge, the valve discharge pipe 30 nevertheless imposes a restriction to the free flow of the separated wax particles from the filter, with the result that the motion of the particles causes the latter to be compacted in the region of the annular space adjacent the filter outlet and in effect to build up a solid wax seal the depth of which determines the filtering capacity.

According to the present invention, the depth of the material seal is automatically maintained constant by means responsive to changes of the consistency of the wax forming the seal. Such means includes an arm or lever 40 having an enlarged paddle or vane-like end 41 extending through the shell 11 into the material forming the seal and which is mounted for movement to a position which is a function of the consistency of the compacted material. This arm 40 is fulcrumed intermediate its ends for turning movement about the transverse axis 42 carried by a pipe connection 43 threaded into the filter shell 11, the pipe also housing the arm 40. The free end of the arm operates against a stem 44 mounted so as to be axially displaced in correspondence to the pivoting or rocking of arm 40 about axis 42. The arm 40 is spring-loaded by a spring 45, the setting of which can be adjusted for a predetermined consistency and hence a predetermined depth of the seal.

The stem 44 constitutes the stem of a pilot air valve AV connected in an air line 47 extending from a suitable source of compressed air, the valve controlling the supply of air through line 48 to an air motor AM for actuating the discharge valve DV.

With the vane 41 extending into the annular space adjacent the discharge end of the filter, and the adjustment of the spring 45 being such that the arm 40 has a definite position corresponding to a predetermined consistency of the compacted wax forming the seal, it will be appreciated that any change in the consistency is reflected in change of position of the arm and corresponding opening or closing of the valve AV which results in operation of the air motor AM to open or close the valve DV.

Preferably the air motor AM is of the conventional type in which a diaphragm 50 is raised by air pressure delivered to the under surface thereof against the action of spring 51. In operation the adjustment of the regulator is such that the valve DV is between full open and closed position when the compacted wax has the predetermined consistency required for the proper depth of seal, arm 40 then having a position resulting in proper degree of opening of the air valve AV. In case the material forming the seal softens due to change of temperature, pressure, or consistency of the slurry or like material supplied to the filter, the vane end 41 of the arm 40 moves against the motion of the softened wax, i. e., clockwise in Fig. 2, with the result that the air valve AV closes to restrict the flow of air to the motor AM, whereupon the valve DV moves toward its closed position under the action of spring 51, and imposes further restriction to the discharge of the compacted material, with the result that the compacting thereof proceeds until the consistency thereof returns to the predetermined consistency. With the latter condition obtaining, vane 41 returns to its initial position with the motion of the material, whereupon valve AV is opened, permitting an increased supply of air to motor AM to reposition the valve DV.

The above described apparatus for regulating the processing of compacted wax particles and like solids or semi-solids forming a material seal provides an effective means for maintaining automatically a shallow depth of material seal as has been found to be desirable in operating the filter at its optimum filtering rate. Moreover, such a regulator maintains close supervision over the consistency of the material forming the seal and thereby prevents the seal from being lost when a change in pressure, temperature, and consistency of the entering material occurs. Due to the fact that the regulator detects softening of the seal immediately upon its occurrence and acts to close the discharge valve before blow-by can occur, such a regulator permits filter operation with a seal of constant and more shallow depth than is possible with manual regulation, and in addition to being a labor-saver provides a nicer regulation than has been heretofore obtainable by the employment of manual regulating means.

As many changes could be made in carrying out the above construction without departing from the scope of the invention, it is intended that all matter contained in the above description or shown in the accompanying drawings shall be interpreted as illustrative and not in a limiting sense.

I claim:

1. Apparatus of the character described consisting of, in combination, means providing a space for the treatment of semi-solid and like plastic materials, an inlet through which the material is supplied to said space under pressure and an outlet for the discharge of the treated material, means disposed in said space for moving the material through said space to progressively compact the treated material adjacent the outlet thereby to form a material seal in advance of the outlet and means for maintaining a constant depth of seal including a member movably mounted on said apparatus and extending into the material being compacted and positionable in accordance with the consistency of the compacted material, and an outlet control valve actuable in accordance with the position of said member, means for opening and closing said valve and means actuated by said member for controlling said last-named means, said member moving, independently of said material moving means, to one position to cause closing of the valve when the consistency of the material is too soft and to another position to cause opening of the valve when the consistency of the material is too hard.

2. Apparatus of the character described consisting of, in combination, means providing a space for the treatment of semi-solid and like plastic materials, an inlet through which the material is supplied to said space under pressure and an outlet for the discharge of the treated material, means disposed in said space for moving the material through said space to progressively compact the treated material adjacent the outlet thereby to form a material seal in advance of the outlet and means for maintaining a constant depth of seal including a member movably mounted on said apparatus and extending into the material being compacted and positionable in accordance with the consistency of the compacted material, a motor and means actuated by said member for controlling supply of power to said motor actuatable in accordance with the position of the member, and an outlet valve actuable by said motor, said member moving, independently of said material moving means, to one position to cause closing of the valve when the consistency of the material is too soft and to another position to cause opening of the valve when the consistency of the material is too hard.

3. The combination of a pressure filter consisting of a filter body provided with an inlet for the material to be filtered and an outlet for the solids separating therefrom, a valve controlling said outlet, a filter element contained within said body for separating the solids from the liquid and being provided with an outlet for the liquid filtrate, means disposed within the filter for conveying the separated solids to the solids outlet and for progressively compacting the solids adjacent the outlet to provide a material seal and means for regulating the depth of the compacted solids forming the seal including a member movably mounted on said filter and positionable in the material being compacted in accordance with the consistency thereof and means cooperating with said member and said valve for adjusting the valve in accordance with the position of said member, said last-named means including a valve actuating mechanism and means actuated by the said member to control said mechanism, said member moving, independently of said solids conveying means, to one position to cause closing of the valve when the consistency of the material is too soft and to another position to cause opening of the valve when the consistency of the material is too hard.

4. The combination of a pressure filter consisting of a filter body provided with an inlet for the material to be filtered and an outlet for the solids separating therefrom, a valve controlling flow of solids through said outlet, a filter element contained within said body for separating the solids from the liquid and being provided with an outlet for the liquid filtrate, means for conveying the separated solids to the solids outlet and for progressively compacting the solids adjacent the solids outlet to provide a material seal, means for regulating the depth of the compacted solids including a member movably mounted on said filter and disposed in the path of said solids and movable by changes in the consistency thereof, a motor for actuating the valve and means associated with said member for operating said motor in response to the movement of said member, said member moving, independently of said solids conveying means, to one position to cause closing of the valve when the consistency of the material is too soft and to another position to cause opening of the valve when the consistency of the material is too hard.

5. The combination of a pressure filter consisting of a filter body provided with an inlet for the material to be filtered and an outlet for the solids separating therefrom, a valve controlling said outlet, a filter element contained within said body for separating the solids from the liquid and being provided with an outlet for the liquid filtrate, means for conveying the separated solids to the solids outlet and for progressively compacting the solids adjacent the solids outlet to provide a material seal, means for regulating the depth of the compacted solids including a member movably mounted on said filter and disposed in the path of said solids and movable by changes in the consistency thereof, an air motor for actuating the outlet valve, an air valve connected in the supply line to the motor, and means cooperating with said member for actuating the air valve in accordance with the movement of said member, said member moving, independently of said solids conveying means, to one position to cause closing of the valve when the consistency of the material is too soft and to another position to cause opening of the valve when the consistency of the material is too hard.

ADAM H. GEBAUER.

REFERENCES CITED

The following references are of record in the file of this patent:

UNITED STATES PATENTS

| Number | Name | Date |
|---|---|---|
| 1,054,839 | Hansen | Mar. 4, 1913 |
| 1,577,555 | Beadle | Mar. 23, 1926 |
| 1,624,385 | Bergen | Apr. 12, 1927 |
| 1,772,262 | Naugle | Aug. 5, 1930 |
| 1,784,372 | McCaskell | Dec. 9, 1930 |
| 2,073,553 | Dienst | Mar. 9, 1937 |
| 2,146,692 | Tiedman | Feb. 7, 1939 |
| 2,192,039 | Harcourt | Feb. 27, 1940 |
| 2,272,970 | Frymoyer | Feb. 10, 1942 |
| 2,285,508 | Goss | June 9, 1942 |
| 2,340,009 | Meakin | Jan. 25, 1944 |
| 2,385,238 | Tarbox | Sept. 18, 1945 |
| 2,408,977 | Gebauer | Oct. 8, 1946 |

FOREIGN PATENTS

| Number | Country | Date |
|---|---|---|
| 499 | Great Britain | 1889 |
| 43,777 | Switzerland | Nov. 17, 1908 |
| 430,290 | France | Aug. 5, 1911 |

Certificate of Correction

Patent No. 2,444,563.

July 6, 1948.

ADAM H. GEBAUER

It is hereby certified that errors appear in the above numbered patent requiring correction as follows: In the drawing, Figure 1, reverse the direction of the arrows designated by the numeral "2"; and that the said Letters Patent should be read with these corrections therein that the same may conform to the record of the case in the Patent Office.

Signed and sealed this 21st day of September, A. D. 1948.

[SEAL]

THOMAS F. MURPHY,
*Assistant Commissioner of Patents.*